Dec. 4, 1956     T. O. LILLQUIST     2,773,227
WHEEL SLIP CONTROL SYSTEM
Filed Dec. 17, 1953
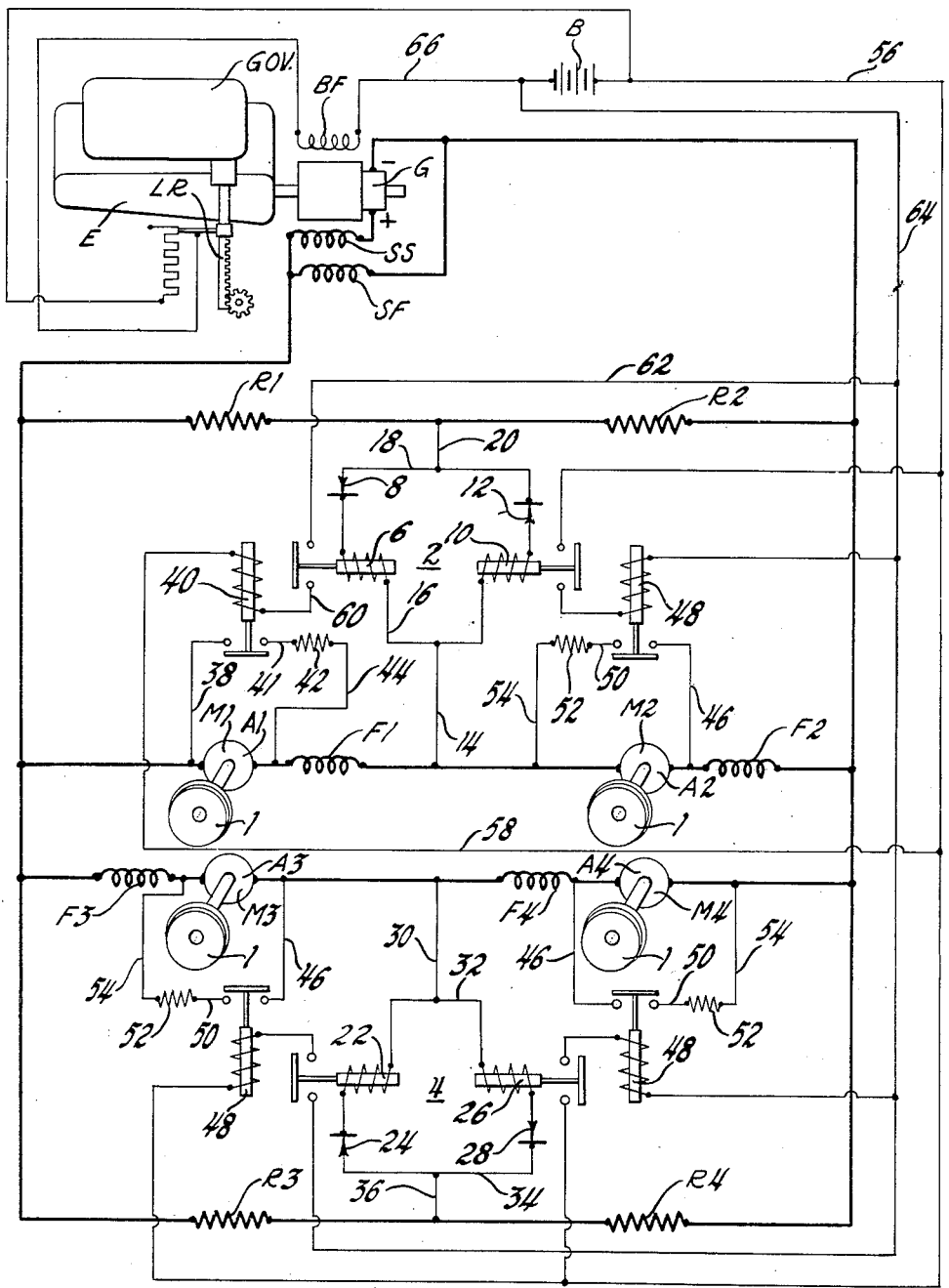
INVENTOR
Torsten O. Lillquist
BY S. C. Thorpe
ATTORNEY

United States Patent Office 2,773,227
Patented Dec. 4, 1956

2,773,227

WHEEL SLIP CONTROL SYSTEM

Torsten O. Lillquist, La Grange Park, Ill., assignor to General Motors Corporation, Detroit, Mich., a corporation of Delaware Application December 17, 1953, Serial No. 398,705

8 Claims. (Cl. 318—52)

This invention relates generally to controls for locomotives having electrical transmissions and more particularly to means for detecting and correcting wheel slip which sometimes occurs during the transmission of power by the electrical transmission from the prime mover to the locomotive wheels.

The modern locomotive usually comprises a prime mover such as a diesel engine and an electrical transmission consisting of a generator driven by the prime mover and one or more traction motors, usually of the series type, which receive energy from the generator and provide the propelling forces for the locomotive through a plurality of driving wheels operatively connected thereto. It is with this type of locomotive that the present invention is primarily concerned.

It will be readily appreciated that when a locomotive is ascending a grade under heavy load or attempting to start a long train from a standstill it is usually desirable and often necessary to as quickly as possible apply full throttle to the prime mover so that its full power may be developed to move the load. If full throttle is applied under heavy loads, however, the power transmitted to the locomotive wheels often causes the wheels to slip or spin on the rails, especially if the adhesion between wheels and rails happens to be poor. Under such conditions the normal procedure is to reduce the throttle setting and the power output of the prime mover and generator either manually or automatically so that less power is supplied to the motors and to continue this reduction of power until wheel slip stops. The trouble with such a procedure, however, is that not only is the power which is supplied to the slipping motor and wheel set reduced, but that which is supplied to the non-slipping motor-wheel sets is also reduced, resulting in an unnecessary loss of motive power just at the time it is most needed.

The purpose of the present invention is to allow the prime mover to develop and the generator to transmit full horsepower at all times during a heavy pull while at the same time maintaining tractive effort; i. e., preventing or detecting and correcting wheel slip as soon as it occurs. The present invention accomplishes the desired result by means which first detect that a particular motor is turning faster than the others and then in response thereto shunt a suitable resistance across the armature of the more rapidly turning motor. Shunting the armature of the over-speeding motor weakens its armature current and increases its field strength. Both of these actions tend to reduce the motor torque and decrease the motor speed to that of the other motors at which time the aforementioned means becomes de-energized ready to again detect and eliminate any further wheel slip.

For a fuller understanding of this invention and the manner in which it accomplishes the purpose set forth above reference may be had to the following detailed description and accompanying drawing, which represents a schematic diagram of this new wheel slip control system.

Referring now to the schematic diagram, the usual power components of a diesel electric locomotive are shown and comprise a prime mover such as diesel engine E which drives a main generator G. The generator G, in turn, supplies power to a plurality of traction motors M1 through M4. The engine E is provided with the usual governor GOV. The generator G is provided with a shunt field SF, a series field SS and a separately excited field BF normally called the battery field. The power output of the diesel engine E and the power demand on the generator G are coordinated by means of a load regulator LR which controls the excitation of the battery field BF in a conventional and well-known manner. The motors M1 through M4 are connected in series parallel relationship across the main generator G by means of certain of the heavy lines shown in the schematic diagram. The motors M1 through M4 are of the series type and include armatures A1 through A4 and fields F1 through F4, respectively. Connected in series relationship across the main generator G and in balanced electrical relationship with the motors M1 and M2 are a pair of equal resistors R1 and R2. Similarly, a pair of resistors R3 and R4 are connected in series across the generator G and in balanced electrical relationship with the motors M3 and M4. A battery B is provided to supply voltage to the battery field BF, and also acts as a voltage source for operating the new wheel slip detecting and correcting means to now be described in detail.

It will be noted that a wheel slip detecting circuit indicated generally by the numeral 2 bridges the conductors extending between resistors R1 and R2 and the motors M1 and M2. A similar wheel slip detecting circuit 4 bridges the conductors extending between resistors R3 and R4 and motor M3 and M4. The wheel slip detecting circuit 2 includes a relay 6 in series with a rectifier 8 which allows current to flow through relay 6 in only one direction. Connected in series with each other and in parallel with the energizing coil of the relay 6 and the rectifier 8 are a relay 10 and a rectifier 12. It will be noted, however, that current can flow in only one direction through the energizing coil 10 due to the presence of the rectifier 12. Any current flow through the energizing coil of the relay 10 will be opposite to the current flow through the energizing coil of the relay 6. The circuit which completes the connection of these relay-rectifier sets in parallel in the aforementioned manner includes conductors 14, 16, 18 and 20.

The wheel slip detecting circuit 4, as already mentioned, is similar to the wheel slip detecting circuit 2 and includes a relay 22 and a rectifier 24 connected in series with each other so that current can flow through the energizing coil of relay 22 in only one direction. Circuit 4 also includes a relay 26 and a rectifier 28 connected in series with each other so that current can flow through the energizing coil of relay 26 only in opposition to the current flow through the energizing coil of relay 22. The wheel slip detecting circuit 4 is completed by means of conductors 30, 32, 34 and 36.

It will be observed that the armature A1 of the traction motor M1 may be shunted by means of a circuit which includes a conductor 38, the normally open interlock of a relay 40, a conductor 41, a shunting resistor 42 and a conductor 44. Motors M2, M3 and M4 are provided with similar shunting circuits, each of which for briefness will be said to include a conductor 46, the normally open interlock of a relay 48, a conductor 50, a shunting resistor 52 and a conductor 54.

The operation of this new wheel slip control is as follows: If the throttle is in the full open position so that the engine E and generator G are supplying maximum power to the motors M1 through M4 and if at times there is insufficient adhesion between the rails and the locomotive wheels which are connected to the traction motor armatures, one or more of the wheel sets connected to the armatures of motors M1 through M4 may slip. By way of illustration let it be assumed that the wheels 1 connected to the armature A1 of motor M1 begin to slip. If the wheels 1 connected to the armature A1 do slip, the armature speed will increase. This increase in speed of motor armature A1 will increase the back voltage generated by the motor M1 and will, consequently, decrease the amount of current that can flow therethrough. This increase in back voltage upsets the balanced condition between motors M1—M2 and resistors R1—R2 to cause current to flow through the wheel slip detecting circuit 2. The direction of current flow through wheel slip detecting circuit 2 will, of course, depend on the polarity of the generator G and which motor is spinning. In the example chosen with the generator polarity as indicated the current will flow through slip detector circuit 2 from the R1—R2 resistor circuit to the M1—M2 motor circuit. Because of the presence of the rectifier 12, however, no current will be allowed to flow through the energizing coil of the relay 10. Consequently, the current will flow through the conductor 20, the conductor 18, the rectifier 8, the energizing coil of the relay 6 and conductors 16 and 14. This flow of current energizes the relay 6 and causes its normally open interlock to close. Closure of the normally open interlock of relay 6 closes the circuit which energizes the relay 40 to thereby connect the shunting resistor 42 across the armature A1 of motor M1. Energization of the relay 40 is accomplished by current flowing from the positive side of the battery B through conductors 56 and 58, the energizing coil of relay 40, a conductor 60, the now closed interlock of relay 6 and conductors 62, 64 and 66 returning to the negative side of the battery B. It should be noted that by completing the shunting circuit, including the shunting resistor 42, around the armature of motor M1 its armature current will be reduced but its field strength will be increased, both of which tend to slow the motor down. This may be understood when it is realized that over-speeding of the motor due to wheel slippage is caused by the fact that the counter-active torque when the wheels adhere to the rails is less than the applied motor torque. Since motor torque is proportional to armature current a reduction in the armature current will reduce the motor torque and this at the higher motor speed tends to slow the motor down and stop the wheels from spinning on the rails. By increasing the current through the field F1 the excitation of the motor is increased and this at the higher motor speed also tends to slow the motor down.

As soon as the speed of motor M1 is reduced so that the wheels connected thereto adhere to the rails and motors M1 and M2 are rotating at the same rate, a balanced condition will again be set up which will de-energize the bridge circuit 2 including the relay 6. De-energization of relay 6, in turn, de-energizes relay 40 which opens the shunt circuit around armature 1.

It will be observed that polarization of relays 6 and 10 by means of rectifiers 8 and 12 actually enables the wheel slip detecting means to determine which motor and set of wheels is slipping so that the shunt can be applied around the proper motor armature. This is believed to be a distinctive feature of this invention, since no such means for selectively detecting the presence of wheel slip between a plurality of motors has ever been observed heretofore. If it is desired, indicator means may be placed in the parallel circuits which include rectifiers 8 and 12 to tell the operator which motor is over-speeding.

If the wheels connected to motor M2 should slip and motor M2 should start to over-speed the operation is similar except that because of the increased back voltage of motor M2 current will flow from the conductor connecting motors M1 and M2 through the bridge circuit 2 to the conductor connecting resistors R1 and R2. The path of this current, however, will be through the energizing coil of the relay 10 since by reason of the rectifier 8 no current can flow upwardly through the circuit which includes the energizing coil of relay 6.

Energization of relay 10 closes its normally open interlock to complete a circuit which will energize the relay 48. Energization of relay 48 completes a shunting circuit including the shunting resistor 52 about the armature A2 of motor M2. This shunt circuit will act to reduce the torque of motor M1 until it stops over-speeding and the wheels connected thereto again adhere to the rails. The operation of the wheel slip control means for motors M3 and M4 is the same as has been described for motors M1 and M2.

I claim:

1. In combination a self-propelled vehicle and a system of electrical control including means for eliminating wheel slippage, said vehicle comprising a motor having a driving wheel fixed thereto and furnishing the motive power for said vehicle, and a generating electric power plant connected to said motor and producing electrical energy for the use of said motor in consequence whereof the effective torque of said motor sometimes exceeds the counteracting torque applied to said wheel and said wheel slips, said system of electrical control comprising a normally open shunt circuit around the armature of said motor and means responsive to slippage of said wheel to cause closure of said shunt circuit thereby reducing the effective torque of said motor without effecting a change in the energy generating capacity of said power plant.

2. In combination a self-propelled vehicle and a system of electrical control including means for eliminating wheel slippage, said vehicle comprising a motor having a driving wheel fixed thereto and furnishing the motive power for said vehicle, a generating electric power plant connected to said motor for producing electrical energy for the use of said motor in consequence whereof the torque of said motor sometimes exceeds the counteracting torque applied to said wheel causing said motor to over-speed and said wheel to slip, said system of electrical control comprising means responsive to over-speeding of said motor for decreasing the armature current and increasing the field current of said motor whereby its speed is reduced and slippage of said wheel is eliminated.

3. In combination a self-propelled vehicle and a system of electrical control including means for eliminating wheel slippage, said vehicle comprising a motor having a driving wheel fixed thereto and furnishing the motive power for said vehicle, a generating electric power plant connected to said motor for producing electrical energy for the use of said motor in consequence whereof the torque of said motor sometimes exceeds the counteracting torque applied to said wheel and said wheel slips, said system of electrical control comprising a normally open shunt circuit around the armature of said motor closable in response to slippage of said wheel for increasing the field current of said motor whereby its speed is reduced.

4. In a traction and control system, a generating electric power plant, a pair of electric traction motors connected in electrical relationship across said electric power plant and means responsive to differences in the speeds of said traction motors for decreasing the armature current and increasing the field current of the motor having the higher speed whereby its speed is reduced.

5. In a traction and control system, a generating electric power plant, a pair of electric traction motors connected in electrical relationship across said power plant and means responsive to differences in the speeds of said traction motors for increasing the field current of the motor having the higher speed whereby its speed is reduced.

6. In a generating electric locomotive having a plurality of traction wheels, a plurality of electrical traction motors, each of said motors being connected in driving relation to a traction wheel to drive said plurality of wheels at equal speeds, a prime mover driven electrical generator connected in balanced electric power circuit relation with said plurality of traction motors when the traction wheels are driven at equal speeds thereby, a plurality of polarized electric relay control means connected in balanced electrical relation with said traction motors and operable upon unbalanced electrical power relations between said motors upon slippage of any traction wheel to decrease the armature current and increase the field current of the motor connected to said slipping traction wheel whereby the speed of the motor connected to said slipping traction wheel is reduced and slippage of the wheel connected thereto is eliminated.

7. In a generating electric locomotive having a plurality of traction wheels, a plurality of electric traction motors, each of said motors being connected in driving relation to a traction wheel to drive said plurality of wheels at equal speeds, a prime mover driven electric generator connected in balanced electrical power circuit relation with said plurality of traction motors when the traction wheels are driven at equal speeds thereby, a normally open shunt circuit including a shunting resistor therein connected across the armatures of each of said motors, and a polarized electrical relay control connected in balanced electric relation with said traction motors and alternately operable upon unbalanced electrical power relations between said motors upon slippage of any traction wheel to complete said shunt circuit around the armature of the motor connected to said slipping traction wheel to reduce its speed and eliminate slippage of the wheel connected thereto.

8. In combination a locomotive and a system of electrical control including means for eliminating wheel slippage, said locomotive comprising a plurality of motors having driving wheels fixed thereto and furnishing the motive power for said locomotive, a prime mover for producing mechanical energy, and a generating electric power plant connected to said prime mover for changing the mechanical energy of said prime mover to electrical energy, said generating electric power plant being connected to said motors to supply electrical energy for the use of said motors in consequence whereof the torques of said motors sometimes exceed the counteracting torques applied to said wheels causing said motors to over-speed and said wheels to slip, said system of electrical control comprising means for connecting said plurality of traction motors across said generating electric power plant in balanced electrical circuit relation when the traction wheels connected to said motors are driven at equal speeds thereby, normally open shunt circuits including shunting resistors therein connected across the armatures of each of said motors, and a plurality of polarized electrical relay controls connected in balanced electrical relation with said traction motors and operable upon unbalanced electrical power relations between said motors upon slippage of any of said traction wheels to complete the shunt circuit around the armature of the motor connected to said slipping traction wheel to reduce its speed and eliminate slippage of the wheel connected thereto.

References Cited in the file of this patent

UNITED STATES PATENTS

| | | |
|---|---|---|
| 2,313,503 | Baldwin | Mar. 9, 1943 |
| 2,328,994 | Ogden | Sept. 7, 1943 |
| 2,361,200 | Hibbard | Oct. 24, 1944 |